United States Patent
Sellers-Blais

(10) Patent No.: US 10,068,172 B2
(45) Date of Patent: Sep. 4, 2018

(54) METHOD AND SYSTEM FOR SIMPLIFIED KNOWLEDGE ENGINEERING

(71) Applicant: IfWizard Corporation, Corvallis, OR (US)

(72) Inventor: Dominic Sellers-Blais, Corvallis, OR (US)

(73) Assignee: IfWizard Corporation, Coeur d'Alene, ID (US)

( * ) Notice: Subject to any disclaimer, the term of this patent is extended or adjusted under 35 U.S.C. 154(b) by 150 days.

(21) Appl. No.: 14/014,073

(22) Filed: Aug. 29, 2013

(65) Prior Publication Data
US 2014/0081892 A1    Mar. 20, 2014

Related U.S. Application Data

(60) Provisional application No. 61/703,270, filed on Sep. 20, 2012.

(51) Int. Cl.
  *G06N 5/02*    (2006.01)
  *G06N 5/04*    (2006.01)
  *G06N 7/00*    (2006.01)

(52) U.S. Cl.
  CPC ............... *G06N 5/02* (2013.01); *G06N 5/025* (2013.01); *G06N 5/04* (2013.01); *G06N 7/00* (2013.01)

(58) Field of Classification Search
  None
  See application file for complete search history.

(56) References Cited

U.S. PATENT DOCUMENTS

| | | | | | |
|---|---|---|---|---|---|
| 4,658,370 | A | * | 4/1987 | Erman | G06N 5/022 706/11 |
| 4,885,705 | A | * | 12/1989 | Choi | G06N 5/025 396/620 |
| 4,972,328 | A | * | 11/1990 | Wu | G06N 5/022 700/87 |

(Continued)

OTHER PUBLICATIONS

Ting-Peng Liang, "Development of a Knowledge-Based Model Management System," Faculty Working Paper No. 1364, University of Illinois at Urbana-Champaign, May 1987.*

(Continued)

*Primary Examiner* — Kakali Chaki
*Assistant Examiner* — Fuming Wu
(74) *Attorney, Agent, or Firm* — FisherBroyles LLP; Micah Stolowitz

(57) ABSTRACT

A system and method is disclosed for knowledge engineering using a computerized graphical editor to manage and create knowledge-based systems containing a navigable graph of modal pages with conditional content and user interface knowledge. The invention enables the entire knowledge engineering workflow to be performed within a non-technical graphical environment and without requiring a computer programming or mathematical background. Further, the presentation of knowledge as modal pages allows for simple ontological discovery and end-user player operation. Once editing is complete, the method allows for the set of pages, variables, and settings of which the knowledge-based system is composed to be exported into an independently executable knowledge-based system player containing an embedded inference engine.

11 Claims, 9 Drawing Sheets

System Components

(56) References Cited

U.S. PATENT DOCUMENTS

| | | | | |
|---|---|---|---|---|
| 5,259,766 A * | 11/1993 | Sack | | G09B 19/0053 |
| | | | | 434/323 |
| 5,644,686 A * | 7/1997 | Hekmatpour | | G06F 3/0481 |
| | | | | 706/45 |
| 5,673,369 A * | 9/1997 | Kim | | G06N 5/022 |
| | | | | 706/59 |
| 5,701,400 A * | 12/1997 | Amado | | G06N 5/02 |
| | | | | 706/45 |
| 5,802,255 A * | 9/1998 | Hughes | | G06N 5/022 |
| | | | | 706/11 |
| 5,819,092 A * | 10/1998 | Ferguson | | G06F 17/30014 |
| | | | | 717/113 |
| 6,311,194 B1 * | 10/2001 | Sheth | | G06F 17/30595 |
| | | | | 707/E17.095 |
| 6,611,822 B1 * | 8/2003 | Beams | | G06Q 10/10 |
| | | | | 706/11 |
| 7,020,697 B1 * | 3/2006 | Goodman | | G06Q 10/06 |
| | | | | 709/223 |
| 7,181,438 B1 * | 2/2007 | Szabo | | G06F 17/30522 |
| 7,213,009 B2 * | 5/2007 | Pestotnik | | G06F 19/3481 |
| | | | | 706/46 |
| 7,280,991 B1 * | 10/2007 | Beams | | G09B 5/14 |
| | | | | 706/46 |
| 7,316,003 B1 * | 1/2008 | Dulepet | | G06F 17/218 |
| | | | | 717/110 |
| 7,343,364 B2 * | 3/2008 | Bram | | G06N 5/043 |
| | | | | 706/46 |
| 7,428,520 B2 | 9/2008 | Armstrong et al. | | |
| 7,707,508 B1 * | 4/2010 | Moskalonek | | G06T 11/60 |
| | | | | 715/762 |
| 7,970,725 B2 | 6/2011 | Armstrong et al. | | |
| 8,082,539 B1 * | 12/2011 | Schelkogonov | | G06F 17/3089 |
| | | | | 717/106 |
| 8,429,112 B2 * | 4/2013 | Rosenfeld | | G09B 7/04 |
| | | | | 434/327 |
| 8,725,656 B1 * | 5/2014 | Gill | | G06Q 10/101 |
| | | | | 705/331 |
| 9,240,128 B2 * | 1/2016 | Bagchi | | G09B 7/00 |
| 2003/0033182 A1 * | 2/2003 | Stok | | G06Q 10/063 |
| | | | | 705/7.11 |
| 2003/0073518 A1 * | 4/2003 | Marty | | A63B 24/0021 |
| | | | | 473/416 |
| 2003/0216903 A1 * | 11/2003 | Bowers | | G06F 11/28 |
| | | | | 704/4 |
| 2005/0096874 A1 * | 5/2005 | Smiley | | G01R 31/027 |
| | | | | 702/185 |
| 2006/0069995 A1 * | 3/2006 | Thompson | | H04L 67/02 |
| | | | | 715/700 |
| 2006/0149833 A1 * | 7/2006 | Dan | | G06F 17/3089 |
| | | | | 709/218 |
| 2008/0097933 A1 * | 4/2008 | Awaida | | G06Q 10/10 |
| | | | | 705/400 |
| 2008/0313215 A1 * | 12/2008 | Beker | | G06F 17/30882 |
| 2009/0254572 A1 * | 10/2009 | Redlich | | G06Q 10/06 |
| 2011/0161941 A1 * | 6/2011 | Thomson | | G06F 8/34 |
| | | | | 717/140 |
| 2012/0009558 A1 | 1/2012 | Armstrong et al. | | |
| 2012/0317058 A1 * | 12/2012 | Abhulimen | | G06N 99/005 |
| | | | | 706/2 |
| 2014/0081892 A1 * | 3/2014 | Sellers-Blais | | G06N 5/025 |
| | | | | 706/11 |
| 2017/0286396 A1 * | 10/2017 | Sandor | | G06F 17/279 |

OTHER PUBLICATIONS

Vanderdonckt, "Knowledge-Based Systems for Automated User Interface Generation: the TRIDENT Experience," Institute d'Informatique, RP-95-010, Mar. 1995.*

Gennari et al., "The evolution of Prot!eg!e: an environment for knowledge-based systems development," Int. J. Human-Computer Studies 58 (2003), pp. 89-123, 2003.*

Wafers, "A Knowledge Based Program Editor," Proceeding IJCAI'81 Proceedings of the 7th international joint conference on Artificial intelligence, vol. 2, pp. 920-926, Morgan Kaufmann Publishers Inc. San Francisco, CA, USA © 1981.*

Knublauch et al., "The Prot'eg'e OWL Plugin: an Open Development Environment for Semantic Web Applications," The Semantic Web—ISWC 2004, Lecture Notes in Computer Science, vol. 3298, pp. 229-243, 2004.*

Moore et al., "Eclipse Development: using the Graphical Editing Framework and the Eclipse Modeling Framework," IBM RedBooks, Feb. 2004.*

PCT International Search Report and Written Opinion dated May 1, 2014 issued from the US Patent Office for PCT/US13/57379 (15 pages).

* cited by examiner

System Components

Data Model

Editor Activity Flow

Playback Activity Flow

Editor User Interface

Modal Page Detail

Condition Mechanism

Action Mechanism

Widget Controls

METHOD AND SYSTEM FOR SIMPLIFIED KNOWLEDGE ENGINEERING

RELATED APPLICATIONS

This application is a non-provisional of, and claims priority to, U.S. Provisional Application No. 61/703,270 filed Sep. 20, 2012, and incorporated herein by this reference in its entirety.

COPYRIGHT NOTICE

© 2012-2013 IFWIZARD CORPORATION. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

BACKGROUND OF THE INVENTION

Knowledge engineering is the use of computer systems to model complex, functional knowledge. While the generation of any Turing machine representative of external knowledge could be argued as knowledge engineering, knowledge engineering and its related fields such as knowledge management occupy a more specific realm of computer science combining databases and literate programming for intentional modeling and access to human knowledge. Examples of knowledge engineering in practice include semantic web ontologies such as the Dublin Core and Enterprise Decision Support Systems (EDSS) like the Department of the Interior's Wildland Fire Decision Support System (WFDSS).

Knowledge engineering has its historical roots in the expert systems research of the 1960s and 1970s throughout the academic and business Artificial Intelligence (AI) world. Expert systems are an earlier form of knowledge engineering where subject matter experts (SME) codify and systematize their knowledge into a functional knowledge store. For example, the Stanford Heuristic Programming Project created one of the most famous expert systems, MYCIN, in the 1970s to identify infectious bacteria by asking a branching series of questions and relating the answer to a base of over 600 rules through an inference engine.

While there was considerable success with early expert systems and knowledge engineering, technical problems and over-complication have largely inhibited large scale use. For example, despite MYCIN's 69% accuracy (higher than the average performance of human SMEs), the system was never used in practice due to how difficult and time consuming it was to use in practice. Indeed, just the development of MYCIN's relatively small production rules system took over five years.

The so-called "AI winter" began in the 1980s and peaked during the 1990s. This period of disillusionment with the promises of artificial intelligence in areas such as natural language processing and machine learning led to dramatically reduced funding and interest in AI technology. However, while many of the more overhyped implications of AI research were unrealistic or overly simplistic, nearly all areas of AI study yielded considerable improvements and innovations that are in use and continued development today. Due to the stigma of AI, many of these resurgent fields now operate under new names, such as "expert systems" research becoming "knowledge engineering."

While the renewed interest in knowledge engineering has yielded considerable improvements and diversification in its technical representation and application, the fundamental problem that limited the success of expert systems remains the main obstacle to wide spread adoption of knowledge engineering: the technical complexity in the use and, in particular, engineering of knowledge based systems has limited their use such that the vision of broad categories of non-programmer SMEs codifying their knowledge functionally has not been realized.

For example, powerful technologies such as Knowledge Acquisition and Documentation Structuring (KADS) and C Language Integrated Production System (CLIPS) along with their many modern derivatives have been developed to improve and extend knowledge engineering. Furthermore, there was a large interest in the use of knowledge engineering techniques for business rules logic around the turn of the century using software like BizTalk and specifications like Business Process Execution Language (BPEL). However, these different technological innovations, while finding specialized use among the most dedicated and technical parties, have failed to reach non-technical SMEs or "ordinary people" due to their highly complex and technical character.

Concurrent with this perennial "technicalization" of knowledge engineering have been the increased ubiquity of computer technology in everyday life and rapid usability improvements in graphical user interfaces (GUIs). As computer technology has become more omnipresent, several researchers and companies have sought to make more powerful digital content creation available to the masses through more ergonomic GUIs.

Some attempts have been made to apply these simpler interfaces to the development of computer programs such as through HyperCard or Squeak, these programming environments do not present the knowledge modeling and representation concepts of knowledge engineering and are thus unsuited to the development of knowledge bases. While these systems can successfully codify the rules, they lack capabilities for easily capturing and representing complex knowledge to the end user, requiring outside extension or sophisticated programmatic extension. Thus, the continued and present problem is how to make knowledge engineering accessible for the lay SME.

SUMMARY OF THE INVENTION

The following is a summary of the present disclosure in order to provide a basic understanding of some features and context. This summary is not intended to identify key/critical elements of the invention or to delineate the scope of the invention. Its sole purpose is to present some concepts of the present disclosure in a simplified form as a prelude to the more detailed description that is presented later.

Accordingly, it is an object of the present disclosure to provide a simpler and more accessible system for knowledge engineering. It is a further object of the invention that the creation and editing of its products, knowledge-based systems, is done through an entirely graphical user interface that encompasses all essential features of definition, relation, and maintenance.

It is also an object of the present invention to offer a system providing a simplified interface for presenting and interacting with the products of this knowledge engineering. In accordance with the present disclosure, a computer-implemented system implements a modal page metaphor for navigating through the knowledge-based system. Each page may be split into a content element and an interface element, allowing for a consistent experience and expectation for the user. These interfaces may be further simplified with inline help and may be integrated into a larger system. In general, during execution of such a system, the content and user interface elements of a modal page may be conditionally processed by a "player component," based on a truth value of conditions associated with said elements.

Another feature of the present disclosure comprises a complete method for storing and modeling a knowledge-based system during creation, maintenance, and performance. Through this storage such a system may be self-contained and, in some embodiments, would not require any external tools such as compilers or interpreters beyond those provided by a standard operating system installation. The disclosed interface and inference engine are highly portable, allowing for playback in web browsers, desktop applications, and mobile applications and may be executed remotely through a web interface, as a local application, and as a programmatic resource by other systems without additional plugins or specialized tools. These applications are merely illustrative and not intended to be limiting.

The invention is intended to be implemented in software; i.e., in one or more computer programs, routines, functions or the like. Thus it may best be utilized on a machine such as a computer or other device that has at least one processor and access to memory, as further described later. Accordingly, in this description, we will sometimes use terms like "component," "subsystem," "editor," "manager," or the like, each of which preferably would be implemented in software.

BRIEF DESCRIPTION OF THE DRAWINGS

In order to describe the manner in which the above-recited and other advantages and features of the disclosure can be obtained, a more particular description follows by reference to the specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

Figure 1:
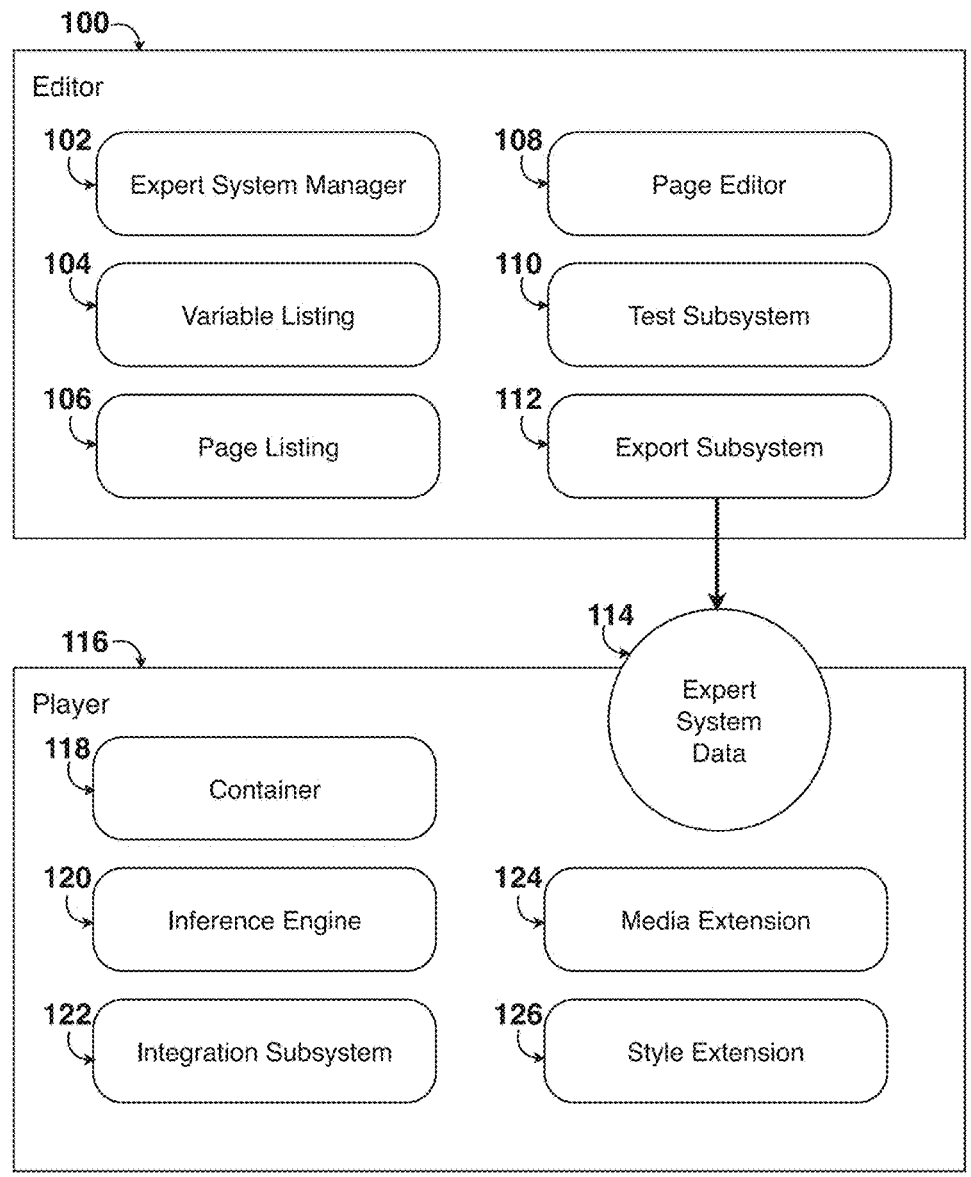
FIG. 1 illustrates the functional components of an illustrative system consistent with the present disclosure.

The following detailed description refers to the accompanying drawings. Wherever possible, the same reference numbers are used in the drawings and the following description to refer to the same or similar elements. For clarity and simplicity, not all characteristics of practical embodiments are described in the specification. However, it is appreciated that many embodiment-specific decisions have to be made in developing the practical embodiments in order to achieve a particular object of the developer. While embodiments of the invention may be described, a person skilled in the relevant art would recognize that modifications, adaptations, and other implementations are possible without parting from the spirit and scope of the invention. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, proper scope of the invention is defined by the appended claims.

FIG. 1 illustrates the functional components of an example of a knowledge engineering editor component 100 and a player component 116. Within the editor component 100, a knowledge-based system manager 102 allows for the creation, deletion, selection, and modification of knowledge-based systems 200 available to the user. Once a knowledge-based system is selected, the remaining editing functionality becomes available.

The variable listing 104 allows for the creation, deletion, and modification of variables 220 within the knowledge-based system. Similarly the page listing 106 allows for the creation, deletion, and modification of pages 202 within the knowledge-based system. In general, knowledge presentation is through pages and, when played, the knowledge-based system preferably displays only one page at any time.

A page editor component 108 allows for the editing of contents 204 and user interfaces 208 on an individual page. Most editing operations take place through the page editor. Once the changes have been made to the knowledge-based system, the knowledge-based system may be tested through the test subsystem 110, allowing preview and execution of the knowledge-based system within the editor. With all desired modifications and additions complete, the export subsystem 112 may be invoked to convert the pages into a portable format as knowledge-based system data 114.

To playback the knowledge-based system, the end user operates a player component 116. The player technology may be embedded within a container 118 such as a web page or desktop application harness as selected and configured by the export subsystem 112. The player component uses the inference engine 120 to execute the logic contained within the knowledge-based system data 114. As instructed by this data, the player may call out to the container via the integration subsystem 122, display multimedia through the media extension 124, or modify the visual formatting through the style extension 126. An integration subsystem 122 may be provided for integrating the expert system with other applications or interfaces.

Figure 2:
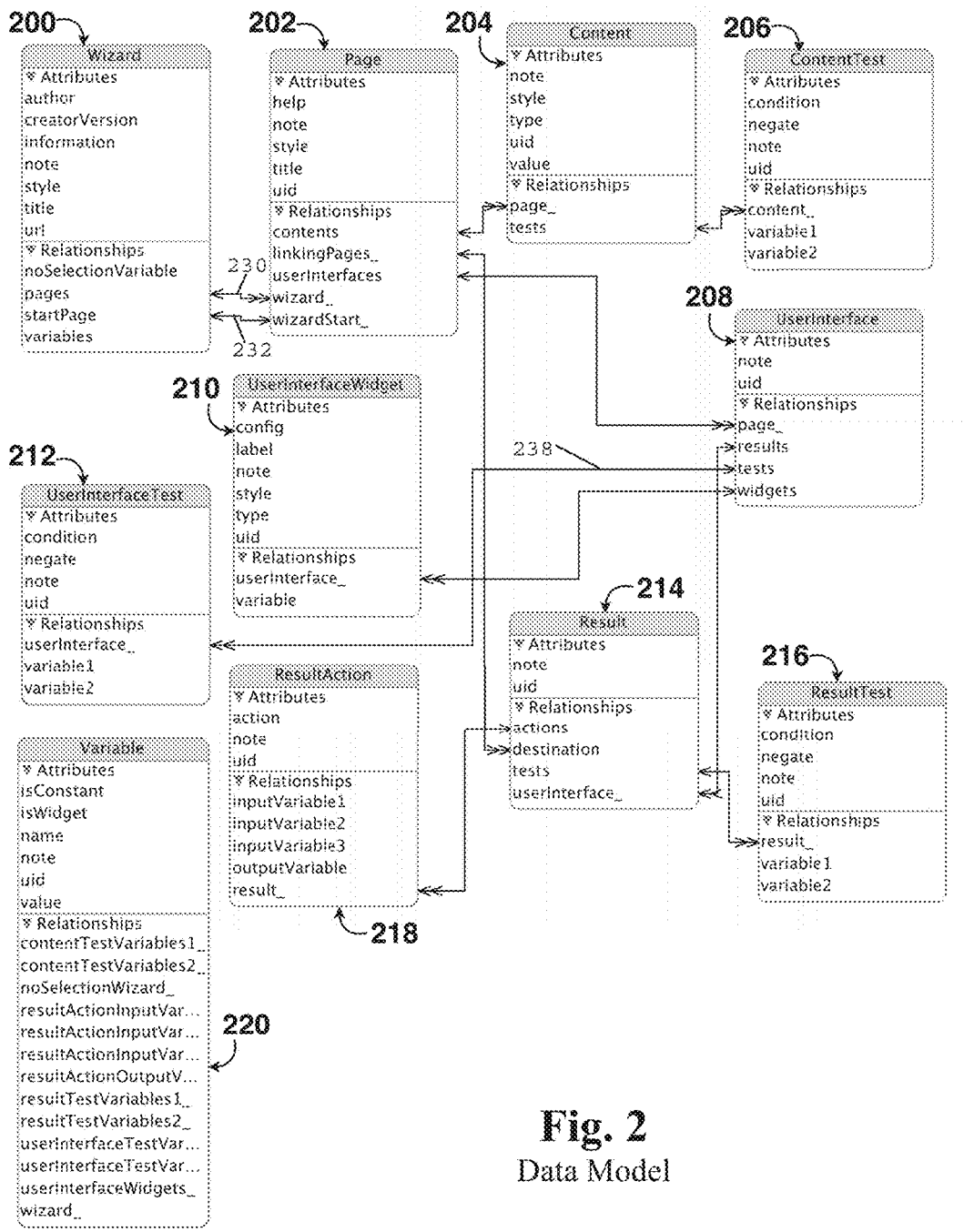
FIG. 2 illustrates an illustrative data model usable with the system of FIG. 1.

FIG. 2 illustrates one example of a data model that may be applied in connection with other aspects of the present disclosure. The figure is a simplified entity relationship diagram depicting how different parts of the system may be modeled internally. Each rounded rectangle is an "entity" that contains a set of variable properties ("attributes") and pointers to or from other entities ("relationships"). Both parent-child/children and child-parent relationships are modeled with the parents indicated by a suffixed underscore. The arrows are single-headed if the relationship points to a single object (i.e. a single parent) and double-headed if the relationship can point to multiple objects (i.e. children). Certainly, variations on this model theme may be considered equivalent. And the various entity, relationship and attribute names or labels are merely for convenience and are not critical.

To illustrate, referring to FIG. 2, consider the "Page" 202 and "Content" 204 entities. The "Page" entity contains five attributes ("help", "note", "style", "title", and "uid" (unique identifier)) which are all settable for a particular instance of that entity. Among its five relationships is "contents" which points with a double-headed arrow to the "Content" entity. This means that one "Page" may contain several "Content" entities as children in the "contents" relationship.

Conversely, the "Content" entity has a "page_" relationship pointing with a single-headed arrow back to the parent page. So, together the "contents" and "page_" relationships for a bidirectional reference between the two allowing the reader to find the children or parent respectively from a single "Content" or "Page" entity.

Knowledge-based systems may be stored as "wizards" 200 containing basic information such as the author and title. The knowledge-based system may include any number of user defined-variables 220, as well as user constants and the values of widgets 210 after user interaction (discussed later). A wizard may comprise one or more pages 202 (see arrow 230) which implement all the visible and logical functionality of the wizard. The wizard may start operation by default to a designated start page (see arrow 232). In an embodiment, each page contains zero or more contents 204. Contents are the non-interactive static blocks of text and media and may have user-defined variables 220 values embedded within them. Contents typically are displayed only if their content test 206 passes by comparing one or two variables through a condition such as "equals".

Pages 202 also may contain zero or more user interfaces 208 designed to allow and respond to user interaction. A user interface in an embodiment is only displayed if its user interface test 212 passes (see arrow 238). Each user interface may contain zero or more user interface widgets 210. A widget may comprise, for example, a button, multiple choice, text field, or any other user control. The widget may use the user input to determine and assign a corresponding value to a widget variable among variables 220. (see userInterfaceWidgets_among the variable 220 relationships.)

In an embodiment, after the user completes interaction with a current (displayed) page by clicking a button or the default "continue" button if no buttons are shown, and at least one interface is displayed, zero or more results 214 of the interface may be performed. If the corresponding result test 216 of a result passes then the navigation is moved to the first passing result's destination page, if one is selected. Results also contain zero or more result actions 218 which can perform a large number of functions such as setting variables, opening external documents, uploading data to other servers, and integrating with container 118 through the integration subsystem 112. See FIG. 4 and associated text below. It can be seen that these data structures provide an elegant and flexible platform for "encoding" expert knowledge in a wide variety of domains into a convenient, useful form.

Figure 3:
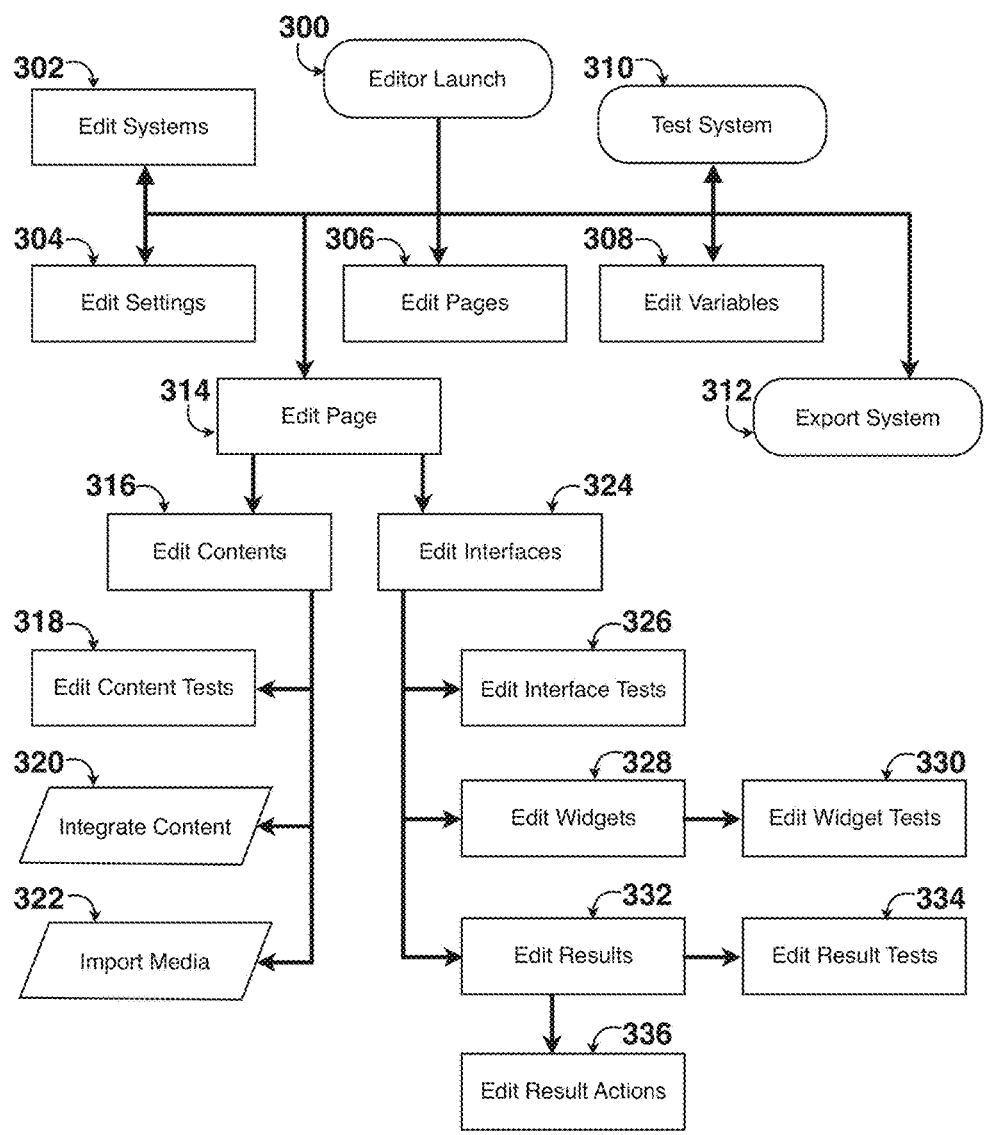
FIG. 3 depicts an illustrative flow of activity during operation of the editor component of FIG. 1.

FIG. 3 depicts an illustrative flow of activity during operation of a knowledge engineering editor such as the editor component 100. In an embodiment, once the editor launches 300, the knowledge engineer may edit or create knowledge-based systems 302, modify a knowledge-based system's general settings 304 such as its description, manage a knowledge-based system's pages 306 or variables 308, test a knowledge-based system 310, export a knowledge-based system 312, or edit a page of a knowledge-based system 314.

When editing a knowledge-based system page 314, the knowledge engineer may edit its contents 316 or user interfaces 324. In addition to editing the content itself 316, the engineer may add, delete, or modify content tests 318, integrate the content 320 through e.g. a script, or import local or remote multimedia 322 such as images, movies, VRML, or audio into the content.

When editing a page 314 the knowledge engineer may also edit the page's user interfaces 324. While doing this, the engineer may edit an interface's tests 326, widgets 328, and results 332. Each widget and result may have multiple widget tests 330 or result tests 334 respectively. Each result may also have any number of actions 336 associated with it.

Figure 4:
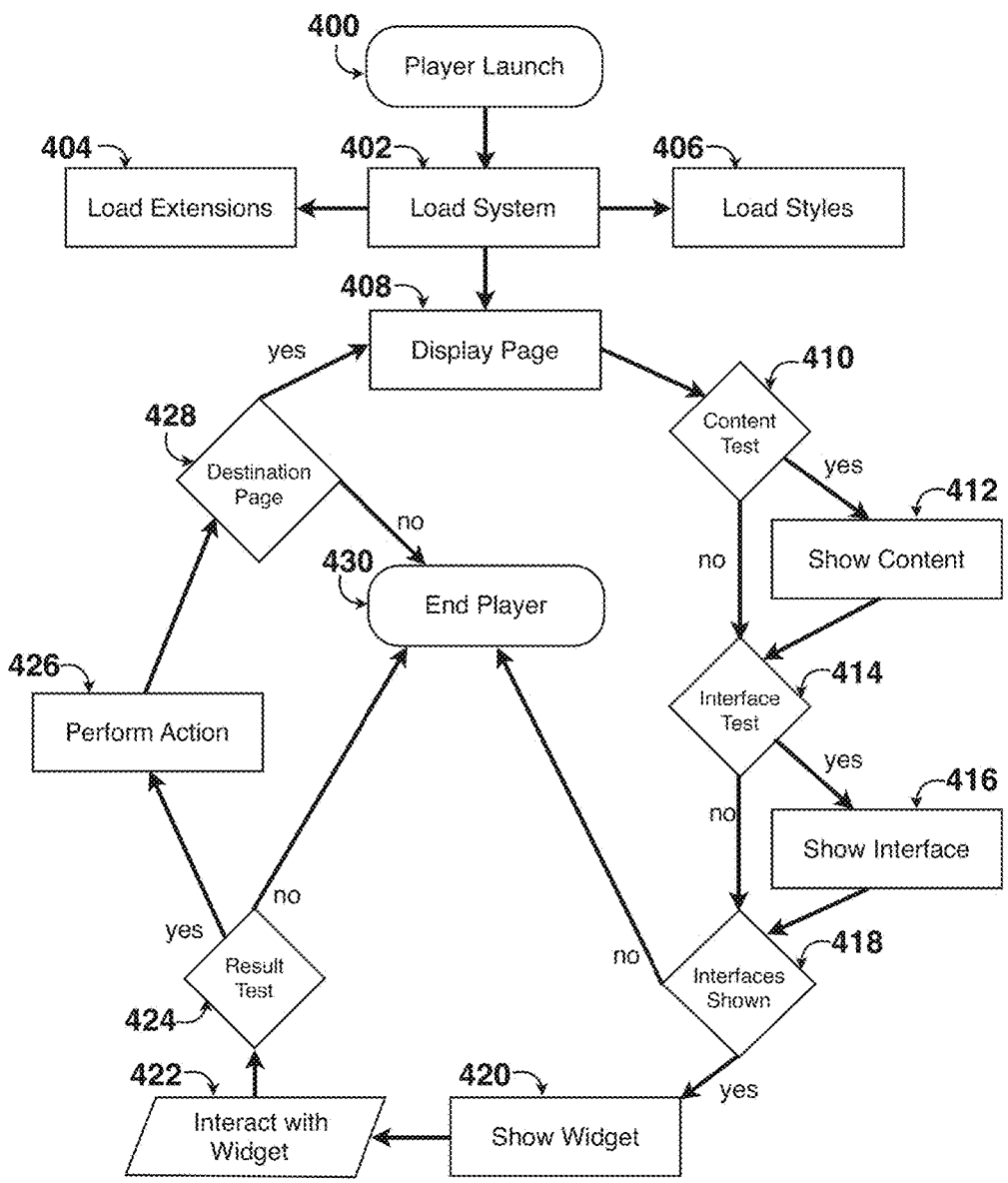
FIG. 4 depicts an illustrative flow of activity during playback of a knowledge-based system consistent with the present disclosure.

FIG. 4 depicts an example of a flow of activity during operation of the knowledge-based system player component 116. After the player launches 400, it loads the knowledge-based system data 402 which may include additional extensions 404 or styles 406 and displays the starting page 408. In operation, for each content element, all associated content tests or conditions are performed 410 and, if all pass, the content is shown 412. In general, a page can (and usually does) contain one or more content elements. See FIG. 6, condition 604, for example. Each of these content elements must pass its associated content test or condition to be displayed. Further, there may be multiple tests, and the inference engine will conduct each of them in the order they appear. In an embodiment, this process may be truncated as soon as any of the tests fails.

After the content is rendered, each interface 208 is tested against its interface test(s) 212. If no interface exists or passes its test 418, playback is ended 430, which does not affect display of the content but results in either a custom user interface or "continue" button navigation to another page being possible, otherwise the interface is displayed 416.

With each interface its widgets 210 are shown 420 allowing the user to interact 422 with the widget user control. When the user has completed interaction with the page and is ready to navigate to the destination page, all results 214 with result tests 216 are tested 424, and all passing result actions 218 are performed 426. If any successful results have a destination page 428, the first of these is navigated to creating a new cycle of page display 408. If there are no destination pages, playback is ended 430.

Figure 5:
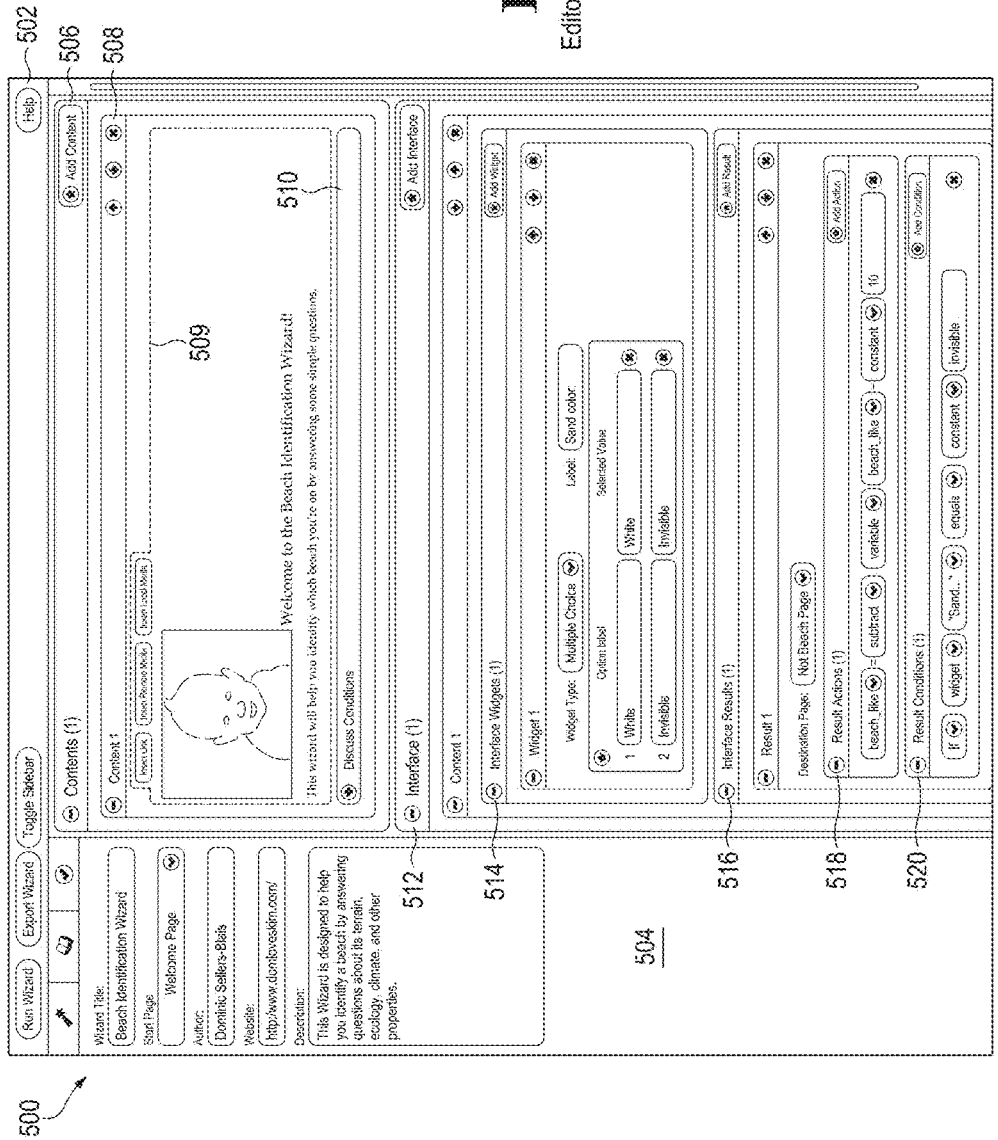
FIG. 5 illustrates an illustrative editor user interface of an exemplary embodiment.

FIG. 5 illustrates an editor user interface 500 of an exemplary embodiment of the system. Basic navigation controls 502 allow access to functions such as testing 310 and exporting 312 the knowledge-based system. The interface 500 is further divided into a sidebar area 504 for modifying the system settings 304, managing pages 306, and editing variables 308 and a page editing area 506.

The page editing area 506 includes the content editor 508 with content test editor 510, the interface editor 512 with its widget editor 514 and result editor 516. The result editor can be further subdivided into its action editor 518 and result test editor 520. The action editor allows for the selection of specific actions such as "subtract", their operation on given user-defined variables, constants, or widget values, and, optionally, the assignment of the action's return value to a variable. The test editors for contents, interfaces, and results may allow for the testing of user-defined variables, constants, or widget values (only for interface and result tests) using a condition such as "equals". The knowledge engineering editor 500 also provides basic facilities for reordering, adding, and deleting elements of the system and for navigating through the information such as with a scrollable page editing area. The exemplary embodiment further allows for the management of a plurality of knowledge-based systems through operating system functionality and a purpose-built interface depending on the presentation of the editor, e.g. through a desktop application, web application, or mobile application.

Figure 6:
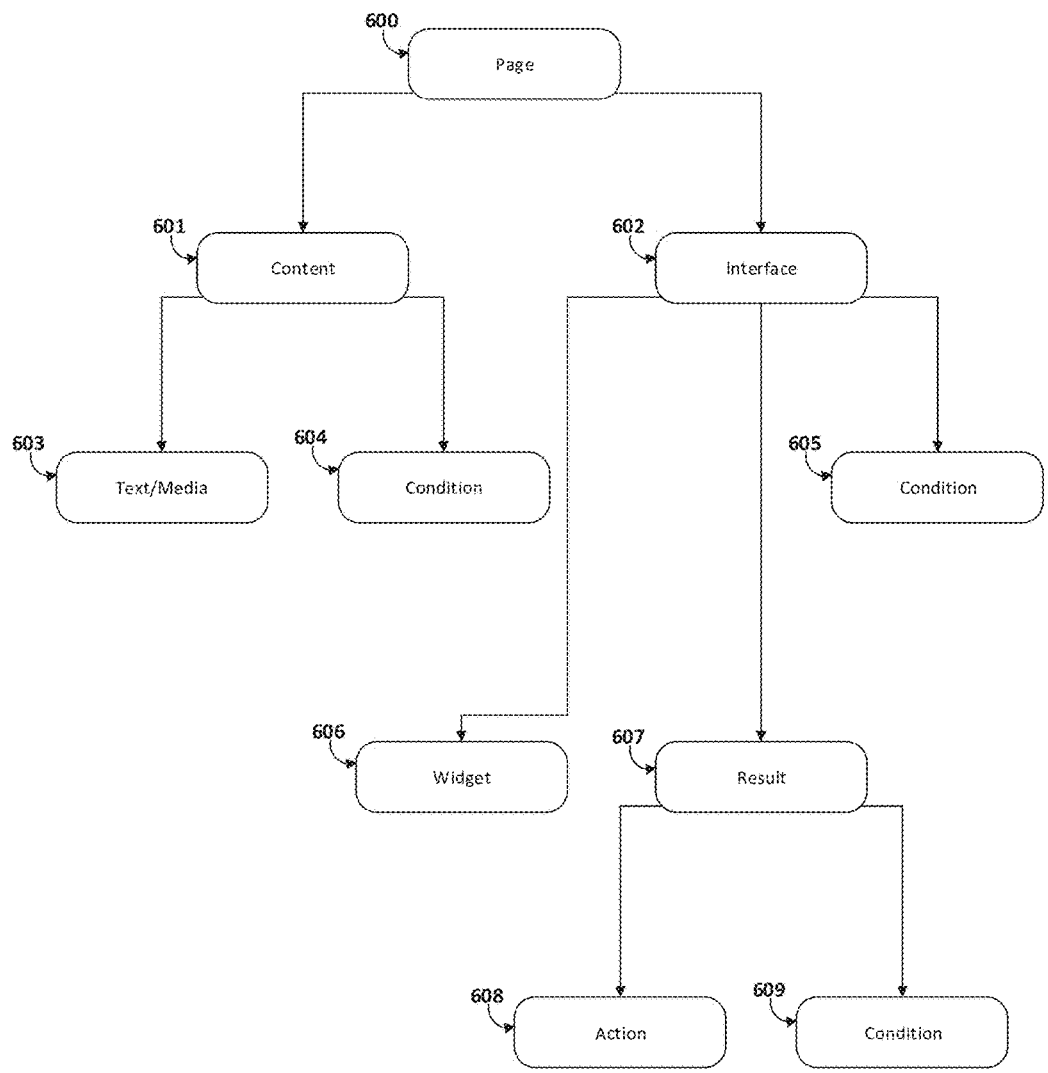
FIG. 6 illustrates the detailed components of an example of a modal page.

FIG. 6 illustrates additional detail of one non-limiting example of a modal page 600 that may be used in the storage and editing of a knowledge-based system. The modal page 600 may contain any number of content 601 and user interface 602 elements. These content 601 and interface 602 elements are processed only if their respective content conditions 604 and interface conditions 605 are all true. If the content 601 element is to be shown, the text and multimedia elements 603 are rendered. The rendering in some cases may invoke any stored scripts or variable references through naming the variable such as {{name}} so that the text of "The name you entered is {{name}}" when the "name" variable is "John" would be rendered as "The name you entered is John."

In an embodiment, interface 602 elements may contain any number of widgets 606 which are used to gather user input that may be assigned to a variable. Additionally, interface 602 elements may contain any number of results 607. Results 607 are comprised by an optional destination page and any number of actions 608 which are to be performed if all of the attendant result conditions 609 are true. If a destination page is set for a result 607 then the destination page is presented after the actions 608 are performed if the conditions 609 are all true. If a result 607 causes navigation away from the page before a subsequent conditionally-true result 607 is reached, that subsequent result's actions are simply ignored, providing first-true rule matching.

Figure 7:
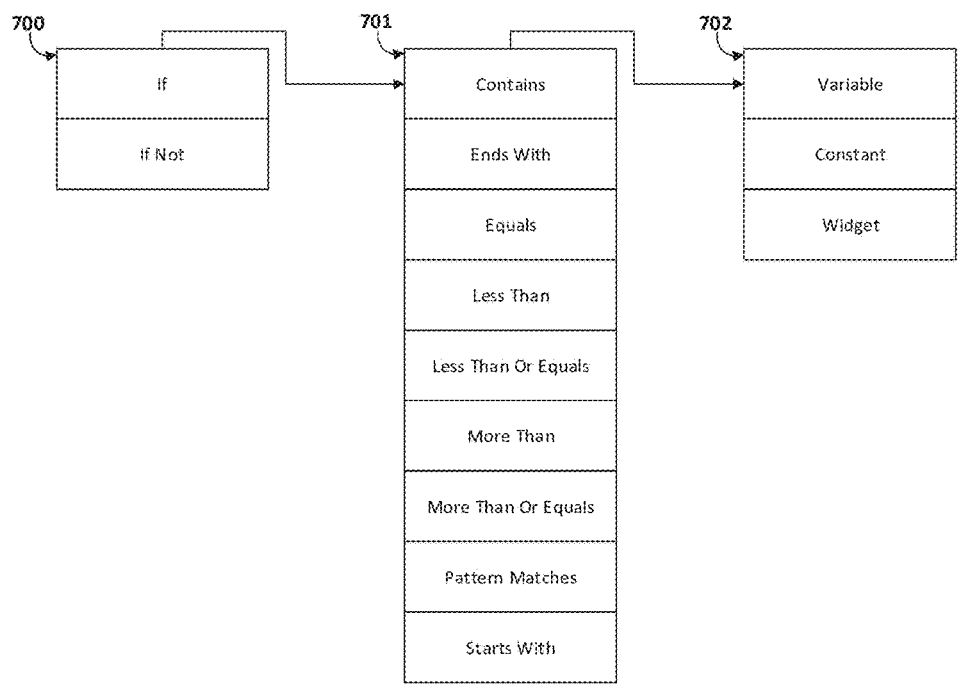
FIG. 7 illustrates a condition mechanism of an exemplary embodiment.

FIG. 7 illustrates one example of a mechanism by which a content 604 condition, interface 605 condition, or result 609 condition determines its truth value and, hence, whether the associated content 601, interface 602, or result 607 and actions 608 are processed. A condition may have a negation option 700 to determine whether the truth or falsity of the condition is being examined. The operation 701 of the condition determines the specific test action by which its logical value is determined. The operation 701 is accompanied by a literal value with which to perform the comparison or operation upon the operand 702 which may be taken from a named variable, constant literal, or inputted value of a widget. For example, if the operation 701 is specified as "Contains" then the condition is true if the operand 702 contains the given literal, e.g. testing if operand 702 "John" contains the value "oh" would return true or, conversely, false if the negation option 701 was set to "If Not".

Figure 8:
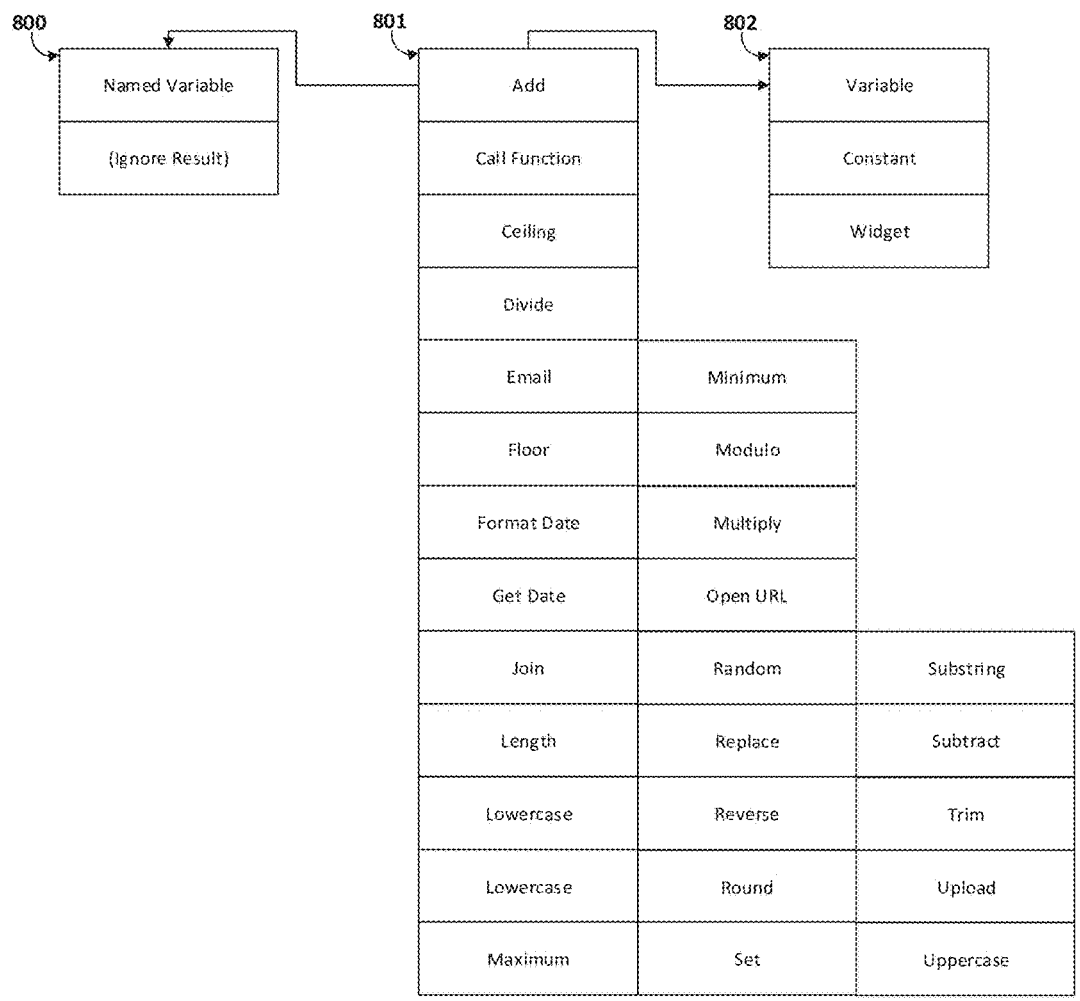
FIG. 8 depicts an illustrative action mechanism of an exemplary embodiment.

FIG. 8 illustrates one example of a mechanism by which an action is defined and processed. An action type 801 is selected from a varied list of possible actions. Most action types 801 are passed one or more input parameters 802 that may be taken from a named variable, constant literal, or inputted value of a widget. Most action types 801 further return a value (i.e. act as a function) which may be set through the output parameter 800 into a named variable. For example, the action type 801 "Add" may be used with two input parameters 802 to add their numerical values together and return the sum into the output parameter 800.

Figure 9:
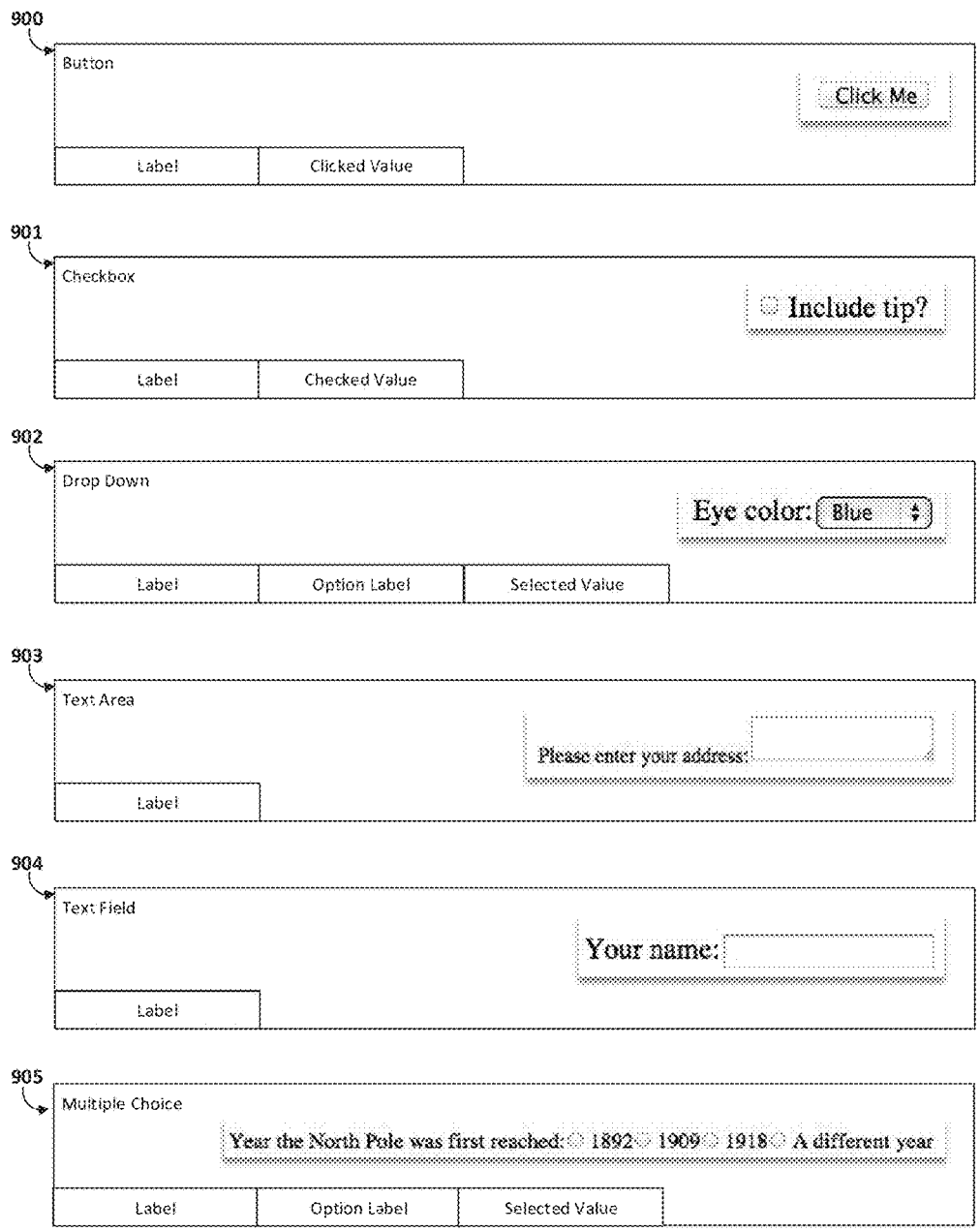
FIG. 9 illustrates an example of widget controls available in an exemplary embodiment.

FIG. 9 illustrates some examples of widget controls available in an exemplary embodiment of the system. Each widget is designed to collect input from the user when navigating the finished knowledge-based system and make it available in a condition operand 702 or action input parameter 802. The exact appearance of the widget is not critical and when rendered may be altered through the style extension 126. Some widgets get their value directly from the explicit input of a user, while others are set to a predetermined value depending on how the user interacts with the widget.

The button 900 widget presents a button with the prompting "label". If the button is clicked, the "clicked value" is stored in the widget, otherwise the widget has an empty value. Significantly, clicking the button initiates processing the page results 607. Therefore, buttons are used as the primary navigation mechanism to move between pages 600 through the destination page setting of a result 607.

The checkbox 901 widget displays an on/off checkbox with the prompting "label". If the checkbox is selected, the "selected value" is stored in the widget, otherwise the widget has an empty value.

The text area 903 and text field 904 widgets display a prompting "label" and accept an explicitly inputted value from the user which is then set as the widget value. The text area 903 provides a larger, multi-line textual input area where the text field 904 is for single, non-breaking textual input.

The dropdown 902 and multiple choice 905 widgets displays a prompting "label" accompanied by a list of "option labels". If an option label is selected, then its corresponding "selected value" is set as the widget value. The drop down 902 provides a more compact widget rendering, hiding the options that are unselected whereas the multiple choice 905 displays all available options in a radio button style interface.

Additional widgets may be developed to capture input and generate values in customized way. Further creative extension may be accomplished by using the "Call Function" action type 801 which allows for interacting with external widgets, databases, and other input sources.

As noted earlier, the present invention is intended to be implemented in software; i.e., in one or more computer programs, routines, functions or the like. In general, aspects of the invention may be utilized in any machine or system that includes at least one digital processor that has access to memory, wherein the digital processor can execute instructions or "code" stored in that memory. (The memory may store data as well.) A digital processor includes but is not limited to a microprocessor, multi-core processor, DSP (digital signal processor), processor array, network processor, etc. A digital processor may be part of a larger device such as a laptop or desktop computer, a PDA, cell phone, iPhone PDA, Blackberry® PDA/phone, or indeed virtually any electronic device.

The associated memory may be integrated together with the processor, for example RAM or FLASH memory embedded in an integrated circuit with a microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Memory may be local and/or remotely located. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a suitable digital processor as further explained below.

Storage of Computer Programs

As explained above, the present invention preferably is implemented or embodied in computer software (also known as a "computer program" or "code"; we use these terms interchangeably). Programs, or code, are most useful when stored in a digital memory that can be read by a digital processor.[1] We use the term "computer-readable storage medium" (or alternatively, "machine-readable storage medium") or the like to include all of the foregoing types of memory, as well as new technologies that may arise in the future, as long as they are capable of storing digital information in the nature of a computer program or other data, at least temporarily, in such a manner that the stored information can be "read" by an appropriate digital processor. By the term "computer-readable" we do not intend to limit the phrase to the historical usage of "computer" to imply a complete mainframe, mini-computer, desktop or even laptop computer. Rather, we use the term to mean that the storage medium is readable by a digital processor or any digital computing system. Such media may be any available media that is locally and/or remotely accessible by a computer or processor, and it includes both volatile and non-volatile media, removable and non-removable media.

[1] In some cases, for example a simple text document or "flat file," a digital computing system may be able to "read" the file only in the sense of moving it, copying it, deleting it, emailing it, scanning it for viruses, etc. In other words, the file may not be executable on that particular computing system (although it may be executable on a different processor or computing system or platform.

Computer Program Product

Where a program has been stored in a computer-readable storage medium, we may refer to that storage medium as a computer program product. For example, a portable digital storage medium may be used as a convenient means to store and transport (deliver, buy, sell, license) a computer program. This was often done in the past for retail point-of-sale delivery of packaged ("shrink wrapped") programs. Examples of such storage media include without limitation CD-ROM and the like. Such a CD-ROM, containing a stored computer program, is an example of a computer program product.

Working Example User Instructions

The following text is excerpted from a user manual for a computer program called IfWizard, which represents one embodiment of certain features of the present disclosure. This section is presented by way of further illustration of the inventive concepts and not limitation.

This is the manual for IfWizard, an application for Mac OS X and iPads that allows you to easily create interactive wizards that can fulfill a variety of purposes. This document will give you information on how to most effectively use IfWizard and how its conceptual parts work together.

IfWizard's intuitive graphical interface makes it easy to create professional wizards without any programming or technical experience, including:

Surveys
Educational Quizzes
Interactive Fiction
Troubleshooters
Multimedia Exhibits
Decision Support Systems
Choose Your Own Adventures
Automated Assistants
Scientific Models and Simulators
Diagnosis Tools
Formal Ontologies
Professional Medical, Financial, Legal, and Scientific Expert Systems IfWizard implements many improvements in knowledge engineering with hundreds of useful features like:

Efficient and Attractive Plain English Interface
Intuitive Page-Based Knowledge
Easy Rich Content Formatting
Include Hyperlinks, Images, Videos, Scripts, and More
Create Interaction With Buttons, Text Entry, Multiple Choice, and More
Support Complex Visual and Logical Interactions
Flexible Conditional Logic
Easy Variables and Constants
Transform Information with Text, Math, and Other Functions
Results Reporting to Email or Web Services
Powerful Customization, Extension, and Integration
Export as Website or Easily Embed into Your Own Website
One Step Export of Complete Standalone OS X and Windows Wizard Applications
No Plugins or Additional Installations Needed for Exported Wizards
Integrated FTP Upload of Your Wizard
Use, Share, and Sell Your Wizards Without Any Fees or Restrictions With IfWizard you build the wizards using a simple, but powerful visual environment called the editor (FIG. 1) where you compose your wizard by creating pages, each with content and user interface sections. When the wizard is run one page is displayed to the user at a time, presenting the content followed by the user interface. Based on the user's actions with the widgets on the user interface, the wizard navigates to a different page and/or performs other actions. What parts of each page are active can be controlled through conditions which can test variables.

Using these simple building blocks, highly advanced wizards can be created quickly and easily without any special training and without any programming These wizards can be exported for embedding into your website or packaged as standalone Mac OS X or Windows applications (Mac OS X version of IfWizard only). Advanced users can customize their wizards to modify the theme or have the wizard interact with other systems.

Your First Wizard

To get started, launch IfWizard. If no wizard appears automatically, create a new one by selecting File→New (IfWizard Professional) or New Wizard (IfWizard Touch). The wizard should appear similarly to FIG. 5 showing the editor's sidebar and main area on the left and right respectively and the toolbar at the top.

The toolbar allows you access to a few core functions such as running (i.e. testing) the wizard and viewing the online help. The sidebar is used to modify elements that apply to the entire wizard such as variables and pages. The main area is where the majority of the editing takes place and, besides the page title, is divided into content and user interface areas.

When you first create a new wizard, the wizard is created with a single page titled "New Page" that has one simple content element and no user interface elements. You can add additional pages by selecting the page tab at the top of the sidebar and pressing the Create button at the bottom the sidebar. Clicking on the page row of a page will select that page, replacing the information in the main area with information about the new page. To change the page's title, click on the existing title of the page or select the page and edit the Page Title field in the main area. Pages can be deleted by pressing the Delete button at the bottom of the sidebar.

Variables work very similarly to pages with a sidebar tab of their own. Not only can you set the variable's name by clicking the text on the left side of the variable row, you can also set an initial value for the variable.

The sidebar also has a tab for setting general configuration about the wizard such as its title and the author of the wizard. Within this tab you may select which page is shown when the wizard first starts by changing the Start Page selection.

Each page may have contents and interfaces added or removed from them using the controls in the main area. You can edit a content's text (e.g. "Welcome to the wizard!") by selecting it and changing it as desired. With IfWizard professional you can apply menu based formatting such as changes to the font or copy and paste more advanced HTML formatting such as tables and lists.

Developing Your Wizard

Most wizards are created by adding several pages and creating one or more contents and interfaces for each page. Navigation between the pages is set up by adding an interface result with a Destination Page set. The editor provides many functions to create, test, and export your wizard.

Once you've finished your wizard, you can test and export it for playback. Playback occurs with the IfWizard engine running your wizard inside a "container" such as a webpage or desktop application (IfWizard Professional only). The remainder of the manual will examine each of IfWizard's components in more depth.

4. Wizards

In IfWizard, the term "wizard" is used for both the editable file that IfWizard uses to store all information about your project and the product of exporting this information, e.g. a webpage. Your wizard, in the sense of an editable file with an .ifwiz extension, contains everything about the wizard including its contents, interfaces, conditions, and settings. The only exception to this rule is that local media that has been inserted into content is stored in a separate internal storage folder (please note that local media is only available in IfWizard Professional).

Each wizard can only access and use elements within itself; one wizard cannot access the variables, pages, and widgets from another wizard. The wizard tab on the sidebar allows you to edit the following different settings for your wizard:

Wizard Title: The user-friendly name of the wizard.
Start Page: The first page shown when the wizard is started.
Author: The author of the wizard (informational only).
Website: A link to the author or more information about the wizard (informational only).
Description: A description of the wizard (informational only).

5. Pages

All user-visible wizard data is contained in pages and using a wizard is fundamentally a process of navigating from one page to another according to a set of rules. Each page is split into two basic sections, contents and interfaces. Wizard must contain at least one page, but there is no set limit on the number of pages.

Pages are managed in the pages tab of the sidebar. You can select a page by clicking on its row in the page tab, loading its contents and interfaces in the main area. Note that clicking directly on the page row's title will allow you to change it, which may also be changed with the Page Title field in the main area. The sidebar's Create button will generate a new page and the Delete button will remove the selected page.

6. Contents

Contents are the text and multimedia displayed in a page. A page may contain multiple contents or none at all and each of them may have their visibility controlled by multiple conditions. Contents are normally the main information displayed to the user and may be accompanied by one or more interfaces and their widgets.

To edit content, click within the dashed contents area and type or paste the information you want to display to the user. Contents may contain rich formatting and styling such as bold, center alignment, and lists on the IfWizard Professional version. You can access formatting parameters in the Format menu or for more complex content you may want to write it in a dedicated word processor like Pages and then copy and paste into IfWizard.

The following buttons, for example, can add special features to the content:

Insert Link: Add a hyperlink to a remote resource such as an http or mailto link. The URL is the destination, e.g. http://www.domloveskim.com and the Label is what is displayed to the user such as "our website".

Insert Remote Media: Add a remotely located file such as an image, audio file, or video to be displayed inline. Note that selecting this does not download the file and make it available locally. Thus, the user of the wizard must be able to access the remote file during playback.

Insert Local Media: Add a local file such as an image, audio file, or video to be displayed inline. This file will be copied into Library/Containers/Application Support/IfWizard/wizard-id and embedded into the wizard when it is exported.

Variable values may be dynamically displayed in content. To do so, put the variable's name into double curly braces. For example, if your variable's name is your-name, you could substitute this in content by entering {{your-name}}. In practice, you might have content like:

Welcome, {{your-name}}! Please enter your favorite color. If your-name had earlier been set to Kimberly, then when the user navigates to the page and views this content it would appear like:

Welcome, Kimberly! Please enter your favorite color.

New contents may be added by pressing the Add Content button. Content may be deleted by pressing the delete button, which look like a circled "x". Content is displayed in the order that is shown in the main area. To change the order, move content up and down with the arrow buttons.

7. User Interfaces

User interfaces are shown after content on a page. Interfaces provide user interactivity on a page through widgets and results. A page may contain multiple interfaces or none at all and each of them may have their visibility controlled by multiple conditions.

New interfaces may be added by pressing the Add Interface button. An interface may be deleted by pressing the delete button, which look like a circled "x". Interfaces are displayed in the order that is shown in the main area. To change the order, move interface up and down with the arrow buttons.

8. Variables

Variables are named parts of your wizard that hold values which can change as the user runs the wizard. For example, you might have variables for things like the users name, address, and phone number and then have the user input values into those variables through widgets. Variables may be used in condition tests or in actions both as input and to store new values. Variables may also be inserted into contents by writing the variable's name between two sets of curly braces, like {{foobar}}.

Variables are managed in the variables tab of the sidebar. The sidebar's Create button will generate a new page and the Delete button will remove the selected page. Clicking directly on the variable's name will allow you to change the name. Clicking in the input box to the right of the equals sign will allow you to set the initial value of the variable, for example you might set a variable named counter to "0".

Variable values do not need to change during wizard operation; you can use them as constants. In more complex wizards, you may want to create a couple "temporary" variables for use in sequences of actions. These temporary variables can be useful for storing intermediate values during text or mathematical operations.

9. Conditions

Conditions are an important feature of IfWizard that allow you to selectively show or perform parts of a wizard. Conditions may be available for contents, user interfaces, and results. If an element has a condition, it is shown or performed only if the condition passes when that element is processed. Preferably, this takes place in the same order as things are listed in the main area, if a first interface, "Interface 1", changes a variable value with its actions, and a second interface, "Interface 2", checks the same variable with a condition, the new variable value from "Interface 1" is used. If more than one condition is checked, they must all pass for the element to be shown or performed.

A condition is created by pressing the Add Condition button. Conditions may be deleted by pressing the delete button, which looks like an "x". Conditions are processed in the same order they are listed in the main area.

Conditions contain multiple parts. The first part of the condition decides whether we are checking if the result is true or false:

If: The condition passes if the result is true.
If not: The condition passes if the result is false.
The type of the first value is specified next:
variable: The value will come from a variable.
constant: The value will come from a literal value that you enter as part of the condition.
widget: The value will come from a widget in the user interface containing this condition (result conditions only).

The value itself is then entered either in a blank field for constants or by selecting the variable or widget. If it is a widget, the widgets are listed in the order they appear in the main area and the first part of the label is shown. For widgets and variables, "-none-" may be selected which will return a blank value. If you delete a variable or widget, conditions depending on them will automatically be set to "-none-".

The key setting for a condition is the condition itself, which may be any of the following (note that all comparisons are case-sensitive):
contains: tests whether value 1 contains value 2. Examples:
value1="Dom Loves Kim", value2="Loves"→true
value1="Dom Loves Kim", value2="Lampshade"→false
If the values are numbers, they are treated as text instead, e.g.:
value1=12345, value2=234→true
ends with: tests whether value 1 ends with value 2. Examples:
value1="Dom Loves Kim", value2="Dom"→false
value1="Dom Loves Kim", value2="Kim"→true
If the values are numbers, they are treated as text instead.
equals: tests whether value 1 equals value 2. Examples:
value1="Dom Loves Kim", value2="Dom"→false
value1="Dom Loves Kim", value2="Dom Loves Kim"→true
value1=434.2, value2=434.2→true
less than: tests whether value 1 is less than value 2. If the values are both text, the comparison is done alphabetically with "a" less than "b" and "A" less than "a". Otherwise, the numbers in the values are used (e.g. "123abc" is converted to 123). Examples:
value1=9, value2=6→false
value1=6, value2=6→false
value1=6, value2=9→true
value1="Dom", value2="Kim"→true
less than or equal: tests whether value 1 is less than or equal to value 2. If the values are both text, the comparison is done alphabetically with "a" less than "b" and "A" less than "a". Otherwise, the numbers in the values are used (e.g. "123abc" is converted to 123). Examples:
value1=9, value2=6→false
value1=6, value2=6→true
value1=6, value2=9→true
value1="Dom", value2="Kim"→true
more than: tests whether value 1 is more than value 2. If the values are both text, the comparison is done alphabetically with "b" more than "a" and "a" more than "A". Otherwise, the numbers in the values are used (e.g. "123abc" is converted to 123). Examples:
value1=9, value2=6→true
value1=6, value2=6→false
value1=6, value2=9→false
value1="Dom", value2="Kim"→false
more than or equals: tests whether value 1 is more than or equal to value 2. If the values are both text, the comparison is done alphabetically with "b" more than "a" and "a" more than "A". Otherwise, the numbers in the values are used (e.g. "123abc" is converted to 123). Examples:
value1=9, value2=6→true
value1=6, value2=6→true
value1=6, value2=9→false
value1="Dom", value2="Kim"→false
pattern matches: tests whether value 1 contains the Perl-style regular expression value 2. Examples:
value1="Dom Loves Kim", value2="[a-z]+"→true
value1="Dom Loves Kim", value2="[0-9]+"→false
starts with: tests whether value 1 ends with value 2. Examples:
value1="Dom Loves Kim", value2="Dom"→true
value1="Dom Loves Kim", value2="Kim"→false If the values are numbers, they are treated as text instead.

The condition is then followed by the type and value of the second variable, constant, or widget. Together, these settings describe the test the condition must pass.

10. Widgets

Interfaces may contain one or more widgets. Each widget represents a user interaction control that is displayed to the user as part of the interface. The selection or input that a widget is given by the user is available in the conditions and actions on that same page. This widget value is not available to other pages although it can be stored into a variable as part of an action and that variable can be accessed by any page. Widgets may be shown in a plain default style as shown in FIG. 9. If you'd like to customize the widget appearance, you may want to customize your wizard's styling.

Widgets may be added with the Add Widget button and may be reordered or deleted using the small buttons on the top of the widget display. Each widget has a Widget Type and a Label. The label is displayed to the user beside the widget, e.g. "Your name:". Several examples of widget controls are illustrated in FIG. 9, described above. Widgets may include, without limitation, the following (again, see FIG. 9 as related text):

Button: When a button is pressed the page's results are processed. If a result with a destination page is shown but no widget buttons are displayed, a default "Continue" button is shown. The widget's value is set to the button's clicked value if the button is clicked. Unlike the other widgets, the label is used as the text of the button.

Checkbox: A checkbox is a simple control that allows for toggling on and off. If the checkbox is toggled on (i.e. checked), the widget's value is set to the checked value. If the checkbox is toggled off, the widget's value is set to unchecked.

Drop Down: The drop down control allows the user to select between multiple options. You create options by pressing the star button. Each option has a label, which is what is shown to the user, and this is shown in the editor as the option label. Each option also has a value that it sets the widget to if it is selected and this is the selected value.

Text Area: The text area control allows the user to enter an extended amount of text as input. The text may have multiple lines and pressing the enter key will create a new line. The widget's value is the text the user entered.

Text Field: The text field allows the user to enter a small amount of text on a single line. The widget's value is the text the user entered.

Multiple Choice: The multiple choice control allows the user to choose one of multiple options. You create options by pressing the star button. Each option has a label, which is what is shown to the user, and this is shown in the editor as the option label. Each option also has a value that it sets the widget to if it is selected and this is the selected value.

11. Results

Each interface may contain one or more results. Results control navigation and allow for actions to be performed. After a button is pressed on the page, the actions of the first result whose interface and result pass their conditions are performed. If the result has a destination page, the wizard navigates to that page without performing additional actions of later results even if their conditions pass.

When an action expects numbers but text values are passed to it, it is converted to a number by removing all non-numeric characters. For example, "a1b2c3" would become 123. If there are no numeric characters or the value is empty, it is treated as a value of 0.

Actions

Each result may have one or more actions, which can perform a variety of functions. Actions typically return a value which may be assigned to a variable. The leftmost setting of the action to the left of the equals sign allows you to choose which variable to assign the variable to or "-none-" to ignore the result. To the right of the equals sign is the type of action, which may be chosen from the following types, which have zero to three values drawn from variables, constants, or widgets:

Add: Adds value 1 to value 2. If both values are numbers, this is performed as an arithmetic operation, otherwise the values are concatenated together like "abc"+"def"="abcdef".

Call Function: An advanced action, this performs the Javascript function named in value 1, passing value 2 as text. The return value of the function is given as the result.

Ceiling: Returns value 1 rounded upwards.

Divide: Divides value 1 by value 2.

Email: Creates and prepares to send an e-mail of the values of all variables to value 1. There is no return value with this action.

Floor: Returns value 1 rounded downwards.

Format Date Returns a human friendly date and time from the timestamp in value 1.

Get Date Returns the current timestamp.

Join: Joins value 1 and value 2 by concatenating them together.

Length: Returns the number of characters in value 1.

Lowercase: Returns value 1 converted to all lowercase letters.

Maximum: Returns the larger of value 1 and value 2.

Minimum: Returns the smaller of value 1 and value 2.

Modulo: Returns the remainder of dividing value 1 by value 2.

Multiply: Multiplies value 1 by value 2.

Open URL: Opens the URL specified in value 1 in a separate browser window (for exported applications, it will open the URL with the default application such as Safari).

Random: Returns a random real number value between 0 to 1 such as 0.4325.

Replace: Returns all instances of value 2 in value 1 with value 3. For example, if values 1, 2, and 3 are "Dom Loves Kim", "Loves", and "Adores" respectively, would return "Dom Adores Kim".

Reverse: Returns value 1 reversed, for example "abcdef" would become "fedcba".

Round: Returns value 1 rounded using the "half-up" rule, e.g. 1.5 is rounded to 2 and 1.4999 is rounded to 1.

Set: Simply returns value 1. This is the most common way to store the value of a widget into a variable.

Substring: Returns a portion of value 1 from the character at value 2 to the character at value 3. Please note that, as with most substring functions, the first character's position is considered to be 0 rather than 1.

Subtract: Subtracts value 2 from value 1.

Trim: Removes the "whitespace" characters like blank spaces on the beginning and end of value 1.

Upload: An advanced action, this opens the URL at value 1 with each variable included as a query parameter. The title of the current page is also passed as a query parameter named "_current_page_". For example, if you are on a page titled, "Upload Page", have one variable named "name" with a value of "Kim", and value 1 is "http://www.example.org/upload", the URL opened is:

http://www.example.org/upload?_current_page_=Upload+Page&name=Kim This action is well suited for outputting wizard results to an external database or other system. There is no return value with this action.

Uppercase: Returns value 1 converted to all uppercase letters.

12. Previewing Your Wizard

Pressing the toolbar Run Wizard button will switch to preview mode, displaying the wizard content as it would look to a user and allowing you to test its functionality. External links in the previewed wizard are ignored. Should the previewed wizard cause the editor display to hide the Back to Main Page button, you can reload the editor by selecting File→Reload Editor. Note that some custom styling isn't available while previewing the wizard or otherwise extending the wizard.

13. Exporting Your Wizard

Once you have created your wizard, you can export it to a webpage or desktop application (IfWizard Professional only). To do so, press the Export Wizard button which will allow you to select an export type from the following options:

Save to Folder (IfWizard Professional Only.) This type of export saves the wizard as a set of files to the specified folder. The index.html file is what should be opened by a web browser to view the wizard. For more information about the files exported and how to customize or integrated them, please see the customization section.

Save at Folder: Folder in which to save the exported files.

Upload to FTP

Saves the exported files directly to a location on an FTP server.

FTP Server: The hostname of IP address of the FTP server, e.g. "ftp.example.com".

Remote Path: An optional directory path to upload into, e.g. "/html/mysite/".

Username: The FTP user's login, e.g. "mysiteuser".

Password: The FTP user's password.

Create Mac OS Application (IfWizard Professional Only.) This type of export saves the wizard as a Mac OS X application that displays a window running the wizard. The application contains the wizard information within the application's Contents/Resources/content folder.

Save at Folder: Folder in which to save the application.

Application Title: The title of the newly created application, which is shown both in the Finder and in the application itself.

Create Windows Applications

This type of export saves the wizard as a Windows application that displays a window running the wizard. The application contains the wizard information within the application's content folder.

Save at Folder: Folder in which to save a folder containing the application.

Application Title: The title of the newly created application.

Email Zipped File (IfWizard Touch Only.) This type of export saves the wizard as a set of files contained within a compressed Zip file that is then e-mailed. The contained index.html file is what should be opened by a web browser to view the wizard. Once e-mailed, you may decompress and modify the files or upload them to a server. For more information about the files exported and how to customize or integrated them, please see the customization section.

Email Address: The e-mail address to which to e-mail the zipped file.

14. Customizing Wizards

When a wizard is exported, several files are created that may be modified to customize the results. As noted in the exportsection, this customize may take place for desktop applications as well as websites, though the integration possibilities differ. Customization is an advanced topic that involves an understanding of other technologies such as Javascript or style sheets.

Note that exporting will overwrite all previously exported files if done in the same location. To more easily preserve your customization while editing your wizard, you may want to export your wizard twice and then copy the newly exported wizard-data.js file, which contains the specifics created by the editor.

Styles

The basic.css file may be modified to alter the appearance of the wizard using Cascading Style Sheets (CSS). The following element classes are used:

if-wizard: Applied to the entire wizard.
if-wizard-page: Applied to current page.
if-wizard-content-container: Applied to the entire stretch of contents.
if-wizard-content: Applied to a specific content.
if-wizard-ui-container: Applied to the entire stretch of user interfaces.
if-wizard-ui: Applied to a specific user interface.
if-wizard-widget: Applied to a specific widget. To apply styling to a particular type of widget, use the HTML control type, e.g. ".if-wizard-widget button".
if-wizard-widget-label: Applied to the label of a widget.
if-wizard-widget-inner-label: Applied to the label of a checkbox.
if-wizard-widget-control: Applied to the specific control of a widget, such as its checkbox.

In addition to these classes, each individual part of a wizard such as its contents has a unique ID that is associated with element both as its id and as a separate class like "ifwizard-page-wifgyjmqa01i". These IDs currently cannot be determined from the editor itself, but may be discovered by inspecting their elements. The IDs are not randomly generated each time the wizard is exported, but are part of the saved wizard data and maintained through its editing.

Embedding

When initially exported, IfWizard creates a very simple index.html file that is used to display the wizard either in a web browser or as the content of your application's window. IfWizard depends on jQuery which is included in the export. If you wish to use your own version of jQuery, replace the line in index.html with one referring to your version. Note that IfWizard does not require any server-side scripting and is completely self-contained, running on the client through Javascript.

There are two routes to embedding your wizard in your own webpage. Generally speaking, the easiest and best route is to place your wizard in a separate folder and embed it into an iframe, such as:

<iframe src="wizard/index.html" frameborder="0" width="800" height="600"></iframe>

In this case you do not need to make any changes to your index.html file, but it would not be meant for directly linking.

Alternatively, you can copy the portions of index.html that include wizard-data.js and wizard.js (in that order) into your own web page. These two files as well as basic.css may all be freely renamed or moved. However, if you have added local media to your content it will be in the /media folder and this must be located in the same folder as the page accessed by the user.

You may freely add or modify the index.html file, providing any kind of media or context around your wizard. Currently if you need to use more than one wizard on a single page, we highly recommend using the iframe method to isolate their data and media. Note that exported desktop applications expect to load the index.html file contained within their contents and this file should not be renamed.

Scripting

Wizards may be extended through scripting through Call Function actions which, when performed, may call out to any Javascript function. While you can use this for built-in functions such as "alert", you may also use it to access your own custom functions and thereby integrate your wizard into a larger web application. As you can both pass variables to the function and set a variable to a function's result, there is a great deal of flexibility in how you extend your wizard with a script.

It will be obvious to those having skill in the art that many changes may be made to the details of the above-described embodiments without departing from the underlying principles of the invention. The scope of the present invention should, therefore, be determined only by the following claims.

The invention claimed is:

1. A non-transitory, machine readable storage manufacture having stored thereon computer program code for execution by a processor, the computer program code comprising:
a graphical editor for building an expert system; and
a player component configured to execute the expert system;
the graphical editor comprising a page editor component configured to interactively build page entities of the expert system, wherein exactly one of the page entities is identified as a start page to be displayed when execution of the expert system is commenced, each page entity consisting of:
one or more content sections and one or more interface sections,
wherein each content section of the page entity is constrained to consist of non-interactive static blocks of informational content for display, without any executable elements or interactive elements, and
each interface section comprising:
at least one widget to acquire input data via a user interface device coupled to the processor, and
at least one interface result entity, the interface result entity identifying at least one of (a) a destination page, and (b) one or more result conditions;
and further identifying one or more specified actions which are to be performed only if the result conditions are true;
the player component arranged to access the start page entity, display the content section of the start page entity, acquire the input data from the user interface device, based on the input data, update zero or more stored variables of the expert system;
and then, access the interface result entity of the start page, test the result conditions based on current values of the stored variables, determine whether the result conditions are true, and if the result conditions are true, executing the actions specified in the interface result entity;
if the interface result entity of the start page specifies a destination page entity, navigate to the destination page entity, display the content section of the destination page entity, acquire second input data from the user interface device, based on the second input data, update zero or more stored variables of the expert system; and
repeat the steps of executing one page entity at a time of the expert system, navigating from each currently displayed page to a selected destination page as determined by analyzing the interface result entity of the currently displayed page;
the graphical editor further including an export subsystem configured to convert the page entities into a portable format to export the expert system for use by an independently executable player system, wherein exported expert system is self-contained, meaning capable of execution without specialized tools, plugins, external programs or access to a knowledge base, as the subject matter expert knowledge for the expert system is captured and reflected in the page entities.

2. The storage manufacture of claim 1, wherein:
each of the interface result entities defines zero or more result actions;
each of the result actions consists of setting a value of a selected output variable based on applying a single selected action mechanism to one or more inputs;
the graphical editor implements a graphical user interface that enables selection of the input from a limited set of choices consisting of a selected variable, a constant, and an input value acquired by a widget; and
the selected variable is selected from a predefined set of variables that is under exclusive local control of the expert system.

3. The storage manufacture of claim 2 wherein the result action is configured, when invoked during execution of the expert system, to execute a predetermined action including one or more of setting a variable, opening an external document, uploading data to other servers, and integrating with a container through a container integration subsystem coupled to the graphical editor.

4. The storage manufacture of claim 1 wherein each result action optionally is associated to one or more result conditions, and the corresponding result action is executed if and only if all of the associated result conditions are met, and wherein
the graphical editor includes a graphical user interface that enables selection of each result condition from a predetermined set of condition mechanisms.

5. The storage manufacture of claim 1 wherein the computer program code includes a player component configured to:
access a portable exported expert system generated by the export subsystem of the graphical editor; and
execute the portable exported expert system independently without specialized tools, plugins, external programs or access to a knowledge base; wherein executing the exported expert system comprises—
first display the content section of the start page;
next display the interface section of the start page including the widget;
utilizing the widget, acquire input data via the user interface device;
based on the acquired input data and the interface result entity of the interface section, navigate to a corresponding destination page; and
repeat the foregoing steps, beginning with displaying the content section of the destination page, so that during execution exactly one page of the expert system is displayed at a time.

6. The storage manufacture of claim 5 wherein the player component is further configured to:
first navigate to the start page;
conditionally display the content section of the start page on the display screen;
conditionally display the interface section of the start page on the display screen, including invoking an applicable widget for user interaction;
conditionally execute applicable results of the interface section based on the user interaction with the widget;
navigate to a destination page associated with the result; and
repeat the following steps utilizing the destination page, and then continue cycling to subsequent destination pages executing the foregoing steps until a termination condition is encountered.

7. The storage manufacture of claim 1 wherein a page entity stores a value for a stored variable in a content section.

8. The storage manufacture of claim 1 wherein the result entity includes zero or more associated result actions that, when invoked during execution of the expert system, assign a value to at least one stored variable.

9. The storage manufacture of claim 1 wherein the page editor component is arranged for providing a condition for a content, user interface or result, wherein display of a particular contents/interfaces or execution of result actions are each conditioned on a corresponding test.

10. The storage manufacture of claim 9 wherein a condition determines a corresponding truth value by applying a selected operation to a selected operand, wherein the operand comprises one of the stored variables, a constant literal, or a value input to a widget.

11. The storage manufacture of claim 10 wherein the selected operation is one of a set of operations that includes "pattern matches", "more than or equals", "more than", "less than or equals", "less than", "ends with", "contains", "equals", and the negated result of each of the foregoing.

* * * * *